(12) United States Patent
Tanaka (10) Patent No.: US 12,366,669 B2
(45) Date of Patent: Jul. 22, 2025

(54) INFORMATION PROCESSING DEVICE AND POSITION MANAGEMENT SYSTEM

(71) Applicant: TOSHIBA TEC KABUSHIKI KAISHA, Tokyo (JP)

(72) Inventor: Hiroyo Tanaka, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 435 days.

(21) Appl. No.: 17/988,792

(22) Filed: Nov. 17, 2022

(65) Prior Publication Data

US 2023/0236327 A1 Jul. 27, 2023

(30) Foreign Application Priority Data

Jan. 24, 2022 (JP) .................. 2022-008894

(51) Int. Cl.
*G01S 19/51* (2010.01)
*G01S 19/43* (2010.01)

(52) U.S. Cl.
CPC .............. *G01S 19/51* (2013.01); *G01S 19/43* (2013.01)

(58) Field of Classification Search
CPC .... G06Q 20/203; G06Q 10/087; G01S 19/51; G01S 19/43
See application file for complete search history.

(56) References Cited

U.S. PATENT DOCUMENTS

| | | | | |
|---|---|---|---|---|
| 2002/0113123 A1* | 8/2002 | Otto | ...................... | G07G 1/0036 235/381 |
| 2005/0218217 A1* | 10/2005 | Hasegawa | .............. | G06Q 30/06 235/383 |
| 2007/0073578 A1* | 3/2007 | Roth | ................... | G06Q 10/1095 705/320 |
| 2012/0119909 A1* | 5/2012 | Rapp | ................... | G08B 13/1427 340/568.8 |
| 2013/0039543 A1* | 2/2013 | Fuhr | ....................... | G08B 27/00 382/103 |
| 2020/0187831 A1* | 6/2020 | Panneer Selvam | ... | A61B 5/1116 |
| 2020/0279113 A1* | 9/2020 | Yanagi | ................. | B65G 1/1371 |
| 2021/0090054 A1* | 3/2021 | Motoki | ............... | G08B 13/246 |

FOREIGN PATENT DOCUMENTS

| | | | | | |
|---|---|---|---|---|---|
| CN | 106516537 A | * | 3/2017 | .......... | B65G 1/1373 |
| CN | 105517922 B | * | 6/2017 | .......... | B65G 1/0492 |
| DE | 102019114372 A1 | * | 12/2020 | | |
| JP | 11-339137 | | 12/1999 | | |
| JP | 11339137 A | * | 12/1999 | | |
| KR | 100814456 B1 | * | 3/2008 | | |
| KR | 101117227 B1 | * | 6/2012 | | |
| KR | 20140065397 A | * | 5/2014 | .......... | B65G 1/1373 |

\* cited by examiner

*Primary Examiner* — Dung Hong

(74) *Attorney, Agent, or Firm* — Amin, Turocy & Watson, LLP (57) ABSTRACT

An information processing device in an embodiment includes an acquiring unit configured to acquire identification information for identifying a commodity placing table moved from a setting position, an updating unit configured to update a position-information storing section that stores the identification information and position information indicating the setting position of the commodity placing table in association with each other, and an output unit configured to, if the acquiring unit acquires the identification information, output alert information concerning the update of the position-information storing section.

20 Claims, 9 Drawing Sheets

| SHELF NUMBER | POSITION INFORMATION | | | PERSON IN CHARGE |
|---|---|---|---|---|
| | COORDINATE X | COORDINATE Y | COORDINATE Z | |
| ... | ... | ... | ... | ... |

FIG. 6

| SHELF NUMBER | COMMODITY |
|---|---|
| ... | ... |

INFORMATION PROCESSING DEVICE AND POSITION MANAGEMENT SYSTEM

CROSS-REFERENCE TO RELATED APPLICATION

This application is based upon and claims the benefit of priority from Japanese Patent Application No. 2022-008894, filed on Jan. 24, 2022, the entire contents of which are incorporated herein by reference.

FIELD

Embodiments described herein relate generally to an information processing device, a position management system, and methods related thereto.

BACKGROUND

In a store selling commodities, for the purpose of, for example, a service for displaying and informing a display position of a commodity to a customer, the position of a commodity placing table (for example, a commodity display shelf) on which the commodity is placed has been managed. Since the position of the commodity placing table is sometimes changed in a campaign, an event, or the like of the store, it is necessary to manage the position of the commodity placing table. There is also an advantage that, by managing the position of the commodity placing table, it is possible to efficiently perform shelf allocation for determining which commodity is arranged in which commodity placing table.

As commodity placing tables used in the store, there are also a commodity display shelf attached with casters, a wagon attached with casters, and the like. Since these commodity placing tables can be easily moved, the commodity placing tables are sometimes moved by a store clerk or a customer in a situation in which an administrator who manages the positions of the commodity placing table does not grasp the movement. In this case, position data of the commodity placing tables managed by the administrator and actual positions of the commodity placing tables do not coincide.

As a result, an operation of the store is hindered, for example, a display position of a commodity is inappropriately informed to a customer. Therefore, it has been desired to, if a commodity placing table is moved, make it possible to easily correct managed position data of the commodity placing table.

DETAILED DESCRIPTION

An aspect of embodiments is to provide an information processing device and a position management system capable of, if a commodity placing table is moved, easily correcting managed position data of the commodity placing table.

An information processing device in an embodiment includes: an acquiring unit configured to acquire identification information for identifying a commodity placing table moved from a setting position; an updating unit configured to update a position-information storing section that stores the identification information and position information indicating the setting position of the commodity placing table in association with each other; and an output unit configured to, if the acquiring unit acquires the identification information, output alert information concerning the update of the position-information storing section.

Information processing devices and position management systems in embodiments are explained below with reference to the drawings. Embodiments are not limited by the embodiments explained below. For example, in the embodiments explained below, an example is explained in which a commodity placing table is a commodity display shelf disposed in a selling floor of a store. However, the commodity placing table may be a shelf used in, for example, a warehouse that stores commodities. That is, the position management systems in the embodiments are not only applied to the selling floor of the store but also can be applied to the warehouse and the like. The position management systems can also be applied to a plurality of stores. For example, the position management systems enable a head office of a company that operates a plurality of stores to manage the positions of commodity placing tables in the stores.

First Embodiment

Figure 1:
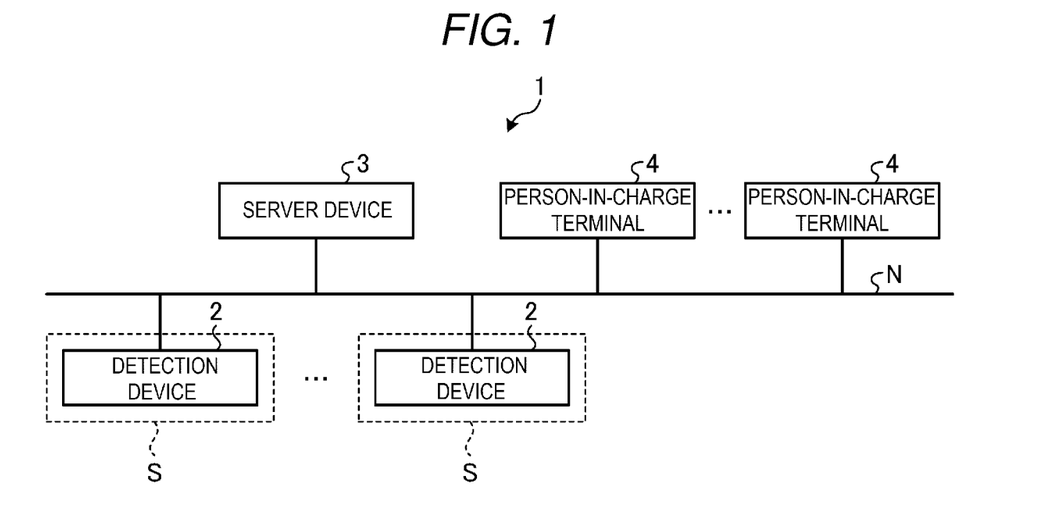
FIG. 1 is a diagram illustrating an overview of a position management system in a first embodiment.

An information processing and a position management system in a first embodiment are explained below with reference to the drawings. FIG. 1 is a diagram illustrating an overview of the position management system. A position management system 1 in this embodiment is applied to, for example, a selling floor of a supermarket where a plurality of commodity display shelves are disposed.

The position management system 1 includes a plurality of detection devices 2, a server device 3, and a plurality of person-in-charge terminals 4. The detection devices 2, the server device 3, and the person-in-charge terminals 4 are communicably connected to one another via a network N such as a wireless LAN (Local Area Network).

The detection devices 2 are respectively provided in a plurality of commodity display shelves 2 disposed in the selling floor. Each of the detection devices 2 detects, using a vibration sensor 22 (see FIG. 2), that the commodity display shelf S is moved. The detection device 2 transmits information indicating that the commodity display shelf S is moved (hereinafter referred to as "detection information" as well) and a shelf number of the commodity display shelf S to the server device 3. The shelf number is an example of identification information for identifying the commodity display shelf S, that is, a commodity placing table. The detection device 2 has an advantage that, by using the vibration sensor 22, the movement of the commodity display shelf S can be detected by an inexpensive configuration.

The commodity display shelf S is a table on which commodities to be sold are placed and is an example of the commodity placing table. The commodity display shelves S disposed in the selling floor include commodity display shelves that can be easily moved such as the commodity display shelf S attached with casters and a wagon attached with casters. The commodity display shelf S in this specification is a concept including the commodity display shelf S attached with casters and the wagon attached with casters and further including a basket or the like that can be put in and out from the commodity display shelf S.

The server device 3 is configured by an administrator PC (Personal Computer) or the like disposed in, for example, a back office of the store. The server device 3 is operated by an administrator who manages the positions of the commodity display shelves S. If receiving detection information from the detection device 2, the server device 3 displays alert information on a display unit of the server device 3. Consequently, the administrator can recognize that the commodity display shelf S is moved and can cause, for example, a store clerk located in the selling floor to check the position of the moved commodity display shelf S.

The server device 3 manages position data of the commodity display shelf S. For example, if acquiring, from the person-in-charge terminal 4, moving destination position information indicating a position of a moving destination of the moved commodity display shelf S, the server device 3 updates the position information of the commodity display shelf S based on the moving destination position information. The server device 3 is an example of the information processing device.

The person-in-charge terminal 4 is a portable terminal carried by each of store clerks located in the selling floor. For example, the person-in-charge terminal 4 is installed with an application program that, by capturing an image of the commodity display shelf S including a background image of the selling floor, can acquire position information indicating a position where the commodity display shelf S is disposed. Consequently, by imaging the moved commodity display shelf S, the person-in-charge terminal 4 can acquire moving destination position information of the commodity display shelf S and transmits the moving destination position information to the server device 3. The moving destination position information may be transmitted from the person-in-charge terminal 4 to the server device 3 by a person in charge inputting recognized position information to the person-in-charge terminal 4. The person-in-charge terminal 4 is an example of the terminal device.

Figure 2:
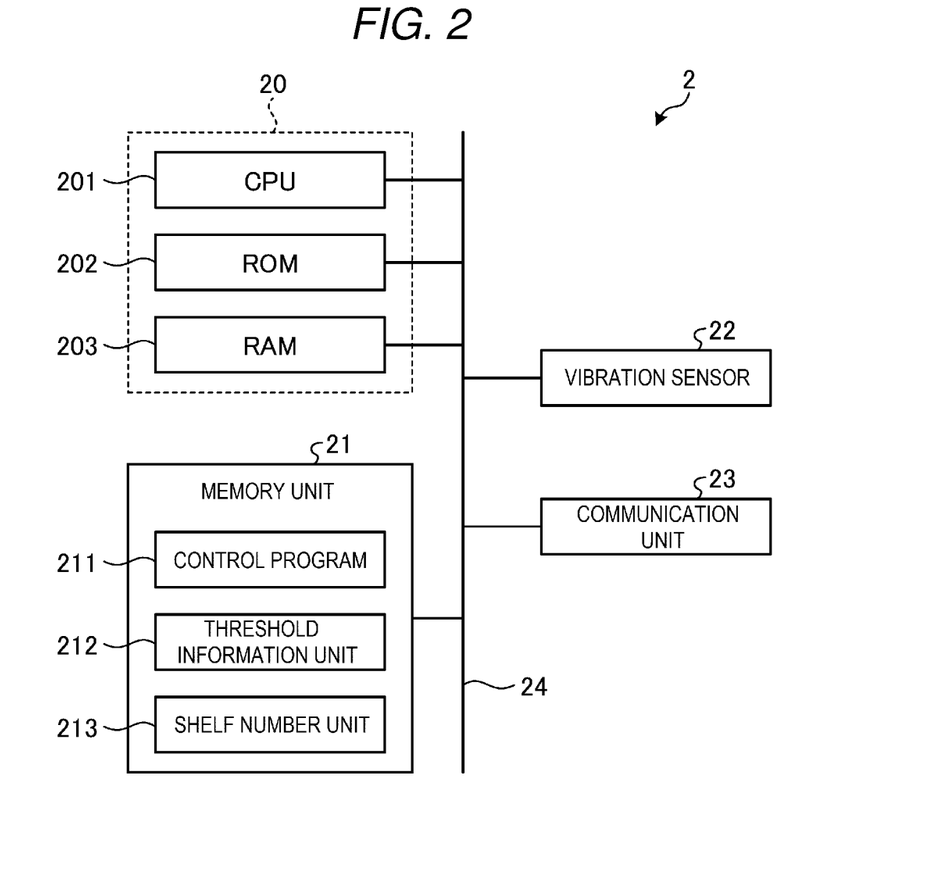
FIG. 2 is a block diagram illustrating a main hardware configuration of a detection device in the first embodiment.

Subsequently, the detection device 2 is explained in detail. FIG. 2 is a block diagram illustrating a main hardware configuration of the detection device 2. The detection device 2 includes a control unit 20, a memory unit 21, a vibration sensor 22, and a communication unit 23. The control unit 20, the memory unit 21, the vibration sensor 22, and the communication unit 23 are connected to one another via a bus 24 or the like.

The control unit 20 has a computer configuration including a CPU (Central Processing Unit) 201, a ROM (Read Only Memory) 202, a RAM (Random Access Memory) 203. The CPU 201, the ROM 202, and the RAM 203 are connected to one another via the bus 24.

The CPU 201 controls the operation of the entire detection device 2. The ROM 202 stores various programs such as a program used to drive the CPU 201 and various data. The RAM 203 is used as a work area of the CPU 201. Various programs and various data stored in the ROM 202 and the memory 21 are loaded in the RAM 203. The CPU 201 operates according to a control program stored in the ROM 202 or the memory unit 21 and loaded in the RAM 203, whereby the control unit 20 executes various kinds of control processing of the detection device 2.

The memory unit 21 is configured by a storage medium such as a HDD (Hard Disk Drive) or a flash memory and maintains stored content even if the detection device 2 is turned off. The memory unit 21 stores a control program 211, a threshold information unit 212, and a shelf number unit 213.

The control program 211 is, for example, a program for realizing a function of detecting that the commodity display shelf S is moved from a setting position and a function of transmitting detection information and a shelf number of the commodity display shelf S to the server device 3.

The threshold information unit 212 stores a threshold used by the detection device 2 to detect movement of the commodity display shelf S. Specifically, the threshold information unit 212 stores a threshold A concerning the magnitude of vibration and a threshold B concerning a time of the vibration. If an output from the vibration sensor 22 is equal to or larger than the threshold A, the detection device 2 determines that vibration occurred in the commodity display shelf S. If the output from the vibration sensor 22 lasted for a time equal to or larger than the threshold B in a state in which the output is equal to or larger than the threshold A, the detection device 2 determines that the commodity display shelf S is moved.

The shelf number unit 213 stores a shelf number of the commodity display shelf S in which the detection device 2 is provided. The shelf number stored by the shelf number unit 213 is set if the detection device 2 is attached to the commodity display shelf S.

The vibration sensor 22 is a sensor widely known in general that can detect vibration of an object. The vibration sensor 22 changes an output value according to vibration that occurred in the commodity display shelf S.

The communication unit 23 is an interface for communicating with external devices such as the server device 3 and the person-in-charge terminal 4. The control unit 20 is capable of transmitting and receiving information (data) to and from the external devices by being connected to the external devices via the communication unit 23.

Figure 3:
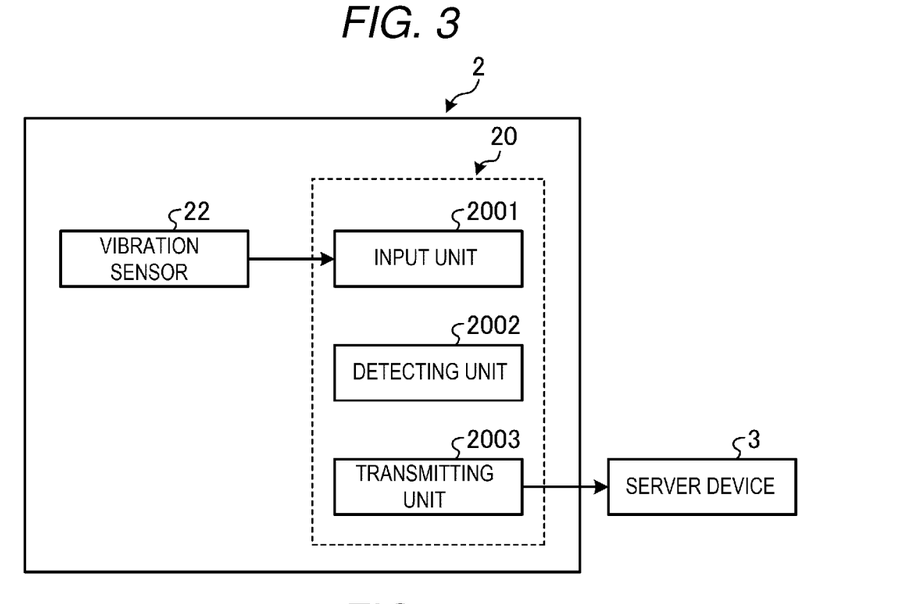
FIG. 3 is a block diagram illustrating a main functional configuration of a control unit of the detection device.

Subsequently, a main functional configuration of the control unit 20 of the detection device 2 is explained. FIG. 3 is a block diagram illustrating a functional configuration of the control unit 20 of the detection device 2. The CPU 201 operates according to a control program stored in the ROM 202 or the memory unit 21, whereby the control unit 20 functions as an input unit 2001, a detecting unit 2002, and a transmitting unit 2003. These functions may be configured by hardware such as a dedicated circuit.

The output value output from the vibration sensor 22 is input to the input unit 2001. The output value of the vibration sensor 22 input to the input unit 2001 changes according to vibration detected by the vibration sensor 22.

The detecting unit 2002 detects that a commodity placing table is moved from a setting position. Specifically, the detecting unit 2002 detects, based on the output value of the vibration sensor 22 input to the input unit 2001, that the commodity display shelf S is moved from a setting position. More specifically, if the output value from the vibration sensor 22 is equal to or larger than the threshold A stored in the threshold information unit 212 and lasted for a time equal to or larger than the threshold B stored in the threshold information unit 212, the detecting unit 2002 determines that the commodity display shelf S is moved from the setting position.

The transmitting unit 2003 transmits, to the server device 3, a shelf number for identifying the commodity display shelf S, the movement of which is detected by the detecting unit 2002. Specifically, if the movement of the commodity display shelf S is detected by the detecting unit 2002, the transmitting unit 2003 transmits the shelf number stored in the shelf number unit 213 to the server device 3 together with detection information.

With the configuration and the function explained above, the detection device 2 can detect that the commodity display shelf S to which the detection device 2 is attached is moved and transmit the detection information and the shelf number to the server device 3.

Figure 4:
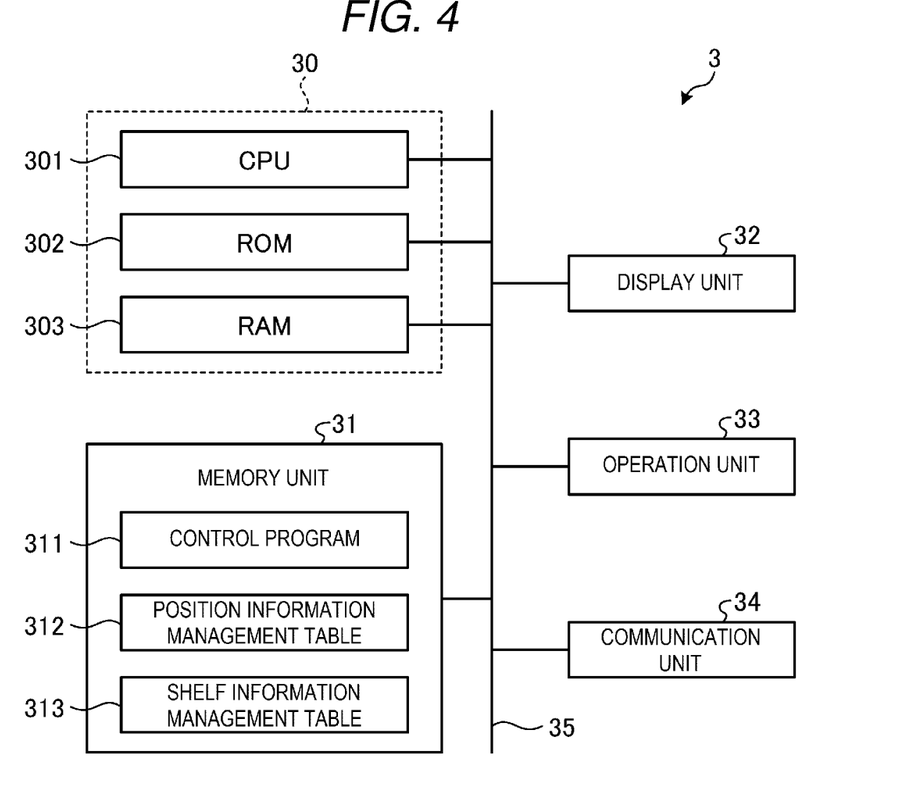
FIG. 4 is a block diagram illustrating a main hardware configuration of a server device in the first embodiment.

Subsequently, the server device 3 is explained in detail. FIG. 4 is a block diagram illustrating a main hardware configuration of the server device 3. The server device 3 includes a control unit 30, a memory unit 31, a display unit 32, an operation unit 33, and a communication unit 34. The control unit 30, the memory unit 31, the display unit 32, the operation unit 33, and the communication unit 34 are connected to one another via a bus 35 or the like.

The control unit 30 has a computer configuration including a CPU 301, a ROM 302, and a RAM 303. The CPU 301, the ROM 302, and the RAM 303 are connected to one another via the bus 35.

The CPU 301 controls the operation of the entire server device 3. The ROM 302 stores various programs such as a program used to drive the CPU 301 and various data. The RAM 303 is used as a work area of the CPU 301. Various programs and various data stored in the ROM 302 and the memory unit 31 are loaded in the RAM 303. The CPU 301 operates according to a control program stored in the ROM 302 or the memory unit 31 and loaded in the RAM 303, whereby the control unit 30 executes various kinds of control processing of the server device 3.

The memory unit 31 is configured by a storage medium such as a HDD or a flash memory and maintains stored content even if the server device 3 is turned off. The memory unit 31 stores a control program 311, a position information management table 312, and a shelf information management table 313.

The control program 311 is, for example, a program for realizing a function of acquiring a shelf number of the moved commodity display shelf S from the detection device 2, a function of updating the position information management table 312 that associates shelf numbers and position information of the commodity display shelves S, and a function of outputting alert information and causing the display unit 32 to display the alert information.

Figure 5:
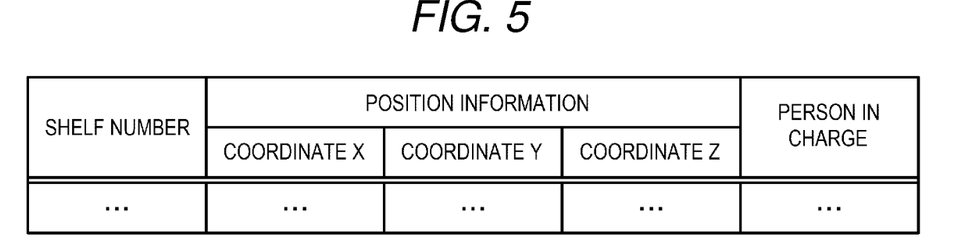
FIG. 5 is a diagram illustrating a data configuration of a position information management table stored in a memory unit of the server device.

The position information management table 312 is a table for managing the positions of the commodity display shelves S disposed in the selling floor. FIG. 5 is a diagram illustrating a data configuration of the position information management table 312. Data registered in the position information management table 312 are associated with information indicating a shelf number, position information, and a person in charge. The position information management table 312 is an example of the position-information storing section. The position information management table 312 may be stored not in the memory unit 31 of the server device 3 but in an external memory.

A shelf number for identifying the commodity display shelf S is registered in an item of the shelf number.

Position information indicating a position where the commodity display shelf S is set is registered in an item of the position information. In this embodiment, data indicating a three-dimensional coordinate in the selling floor is registered. A coordinate X indicates a position in the width direction in the selling floor, a coordinate Y indicates a position in the depth direction in the selling floor, and a coordinate Z indicates a position in the height direction in the selling floor.

In this embodiment, the position information is set as three-dimensional data considering that suspended shelves and the like are used and a plurality of commodity display shelves S overlapping in the height direction are provided. However, the position information may be two-dimensional data. Data in which the selling floor are divided in advance as a setting position X, a setting position Y, and the like may be stored as the position information. The division of the selling floor in this case may be two-dimensional or may be three-dimensional.

Information indicating a person in charge who is in charge of the commodity display shelf S is registered in an item of the person in charge. The information indicating a person in charge is, for example, an employee code, a person in charge name, and the like of the person in charge.

If the position management system 1 is applied to a plurality of stores, information indicating a store is also registered in the position information management table 312. The information indicating a store is, for example, a store code, a store name, and the like for specifying the store.

Figure 6:
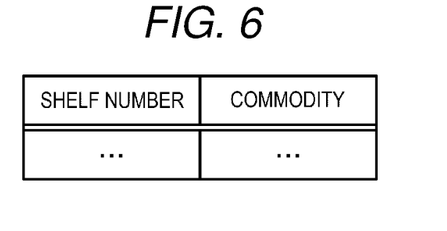
FIG. 6 is a diagram illustrating a data configuration of a shelf information management table stored in the memory unit of the server device.

The shelf information management table 313 is a table for managing commodities displayed on the commodity display shelf S. Information stored in the shelf information management table 313 is used, for example, if a service for informing the position of a commodity to a customer or if shelf allocation for determining which commodity is arranged on which commodity display shelf S is performed. FIG. 6 is a diagram illustrating a data configuration of the shelf information management table 313. Data registered in the shelf information management table 313 are associated with information indicating a shelf number and a commodity.

A shelf number for identifying the commodity display shelf S is registered in an item of the shelf number. Commodity identification information for identifying a commodity is registered in an item of the commodity. The commodity identification information is, for example, a commodity code and a commodity name.

Referring back to FIG. 4, the hardware of the server device 3 is explained. The display unit 32 is configured by, for example, a liquid crystal panel and displays various kinds of information. For example, the display unit 32 displays alert information. The display unit 32 displays, for example, an input screen for inputting data to the position information management table 312 and the shelf information management table 313.

The operation unit 33 is a unit for inputting information to the control unit 30 and is configured by a keyboard, a touch panel provided on the surface of the display unit 32, and the like. Various kinds of information are input to the control unit 30 via the operation unit 33. For example, data to be registered in the position information management table 312 and the shelf information management table 313 are input to the control unit 30 via the operation unit 33.

The communication unit 34 is an interface for communicating with external devices such as the detection device 2 and the person-in-charge terminal 4. The control unit 30 is capable of transmitting and receiving information (data) to and from the external devices by being connected to the external devices via the communication unit 34.

Figure 7:
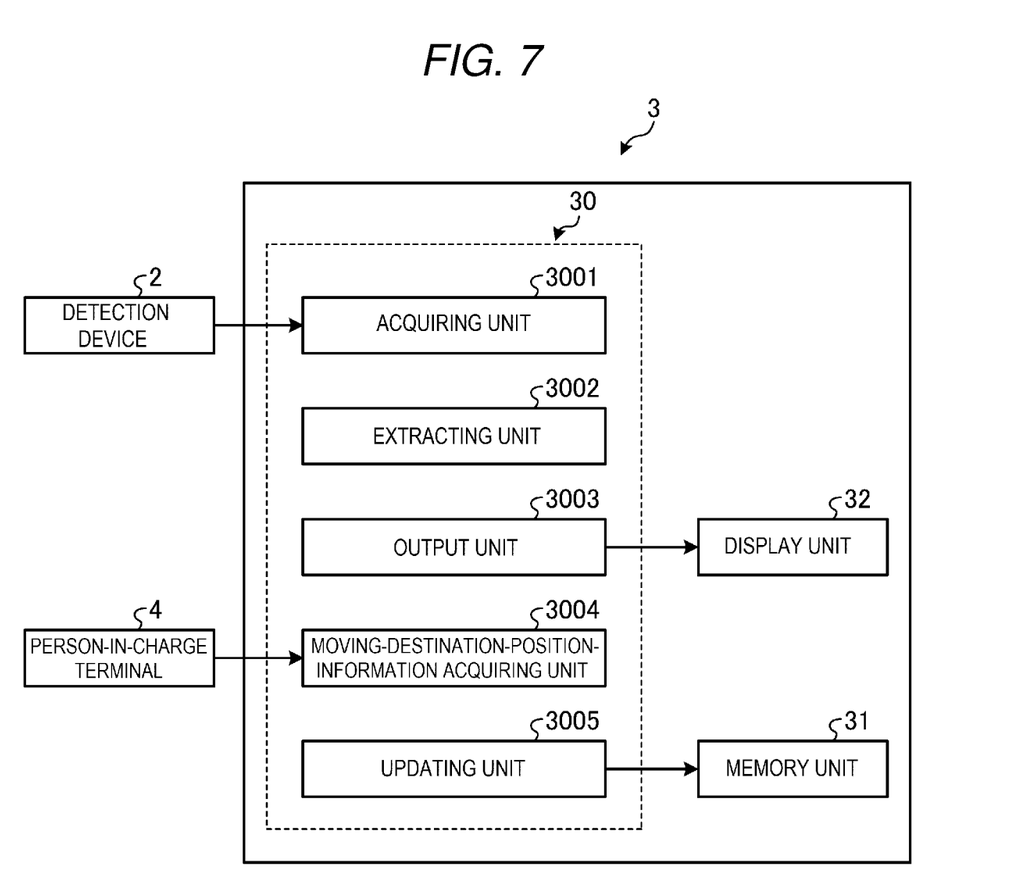
FIG. 7 is a block diagram illustrating a main functional configuration of a control unit of the server device.

Subsequently, a main functional configuration of the control unit 30 of the server device 3 is explained. FIG. 7 is a block diagram illustrating a functional configuration of the control unit 30 of the server device 3. The CPU 301 operates according to a control program stored in the ROM 302 or the memory 31, whereby the control unit 30 functions as an acquiring unit 3001, an extracting unit 3002, an output unit 3003, a moving-destination-position-information acquiring 3004, and an updating unit 3005. These functions may be configured by hardware such as a dedicated circuit.

The acquiring unit 3001 acquires identification information for identifying a commodity placing table moved from a setting position. Specifically, the acquiring unit 3001 acquires, from the detection device 2, detection information indicating that the commodity display shelf S is moved and a shelf number of the commodity display shelf S.

The extracting unit 3002 extracts, from the position information management table 312 and the shelf information management table 313, information to be included in the alert information. Specifically, the extracting unit 3002 extracts, from the position information management table 312 and the shelf information management table 313, any information corresponding to the shelf number acquired by the acquiring unit 3001. In this embodiment, the extracting unit 3002 extracts, from the position information management table 312, information indicating a person in charge (hereinafter referred to as "person-in-charge information" as well) corresponding to the shelf number acquired by the acquiring unit 3001.

Information to be extracted by the extracting unit 3002 can be optionally set by the administrator. For example, if the administrator desires to include position information of the commodity display shelf S in the alert information, the extracting unit 3002 may extract, from the position information management table 312, position information corresponding to the shelf number acquired by the acquiring unit 3001. If the administrator desires to include information concerning a commodity displayed on the moved commodity display shelf S in the alert information, the extracting unit 3002 may extract, from the shelf information management table 313, information concerning a commodity corresponding to the shelf number acquired by the acquiring unit 3001.

If the acquiring unit 3001 acquires the identification information, the output unit 3003 outputs alert information concerning update of the position-information storing section. Specifically, if the acquiring unit 3001 acquires the detection information and the shelf number from the detection device 2, the output unit 3003 outputs, to the display unit 32, alert information including the shelf number, the person-in-charge information extracted by the extracting unit 3002, and a message for urging update of the position information management table 312.

The output unit 3003 may output the alert information to the person-in-charge terminal 4. In this case, the person in charge can browse the alert information with the person-in-charge terminal 4 carried by the person in charge and can immediately check the moved commodity display shelf S.

The shelf number, the person-in-charge information, and the message for urging the update of the position information management table 312 are information useful for the administrator to update the position information management table 312 and is an example of alert information concerning the update of the position-information storing section. The alert information concerning the update of the position-information storing section is information including any information to be registered in the position information management table 312 or the shelf information management table 313 and includes at least a shelf number of the moved commodity display shelf S.

The moving-destination-position-information acquiring unit 3004 acquires moving destination position information indicating a position to where the commodity placing table is moved. Specifically, the moving-destination-position-information acquiring unit 3004 acquires, from the person-in-charge terminal 4, moving destination position information indicating a position to where the commodity display shelf S is moved and a shelf number of the commodity display shelf S. The moving-destination-position-information acquiring unit 3004 may acquire the moving destination position information from another external device that detects the position of a moving destination of the commodity display shelf S. The moving-destination-position-information acquiring unit 3004 may acquire the moving destination position information input from the operation unit 33 according to operation of the administrator who acquired the moving destination position information.

The updating unit 3005 updates the position-information storing section that stores identification information and position information indicating a setting position of a commodity placing table in association with each other. Specifically, if the moving-destination-position-information acquiring unit 3004 acquires the moving destination position information and the shelf number of the commodity display shelf S, the updating unit 3005 rewrites, in the position information management table 312, position information corresponding to the shelf number to the moving destination position information. The updating unit 3005 can rewrite information registered in the position information management table 312 according to operation of the administrator.

Figure 8:
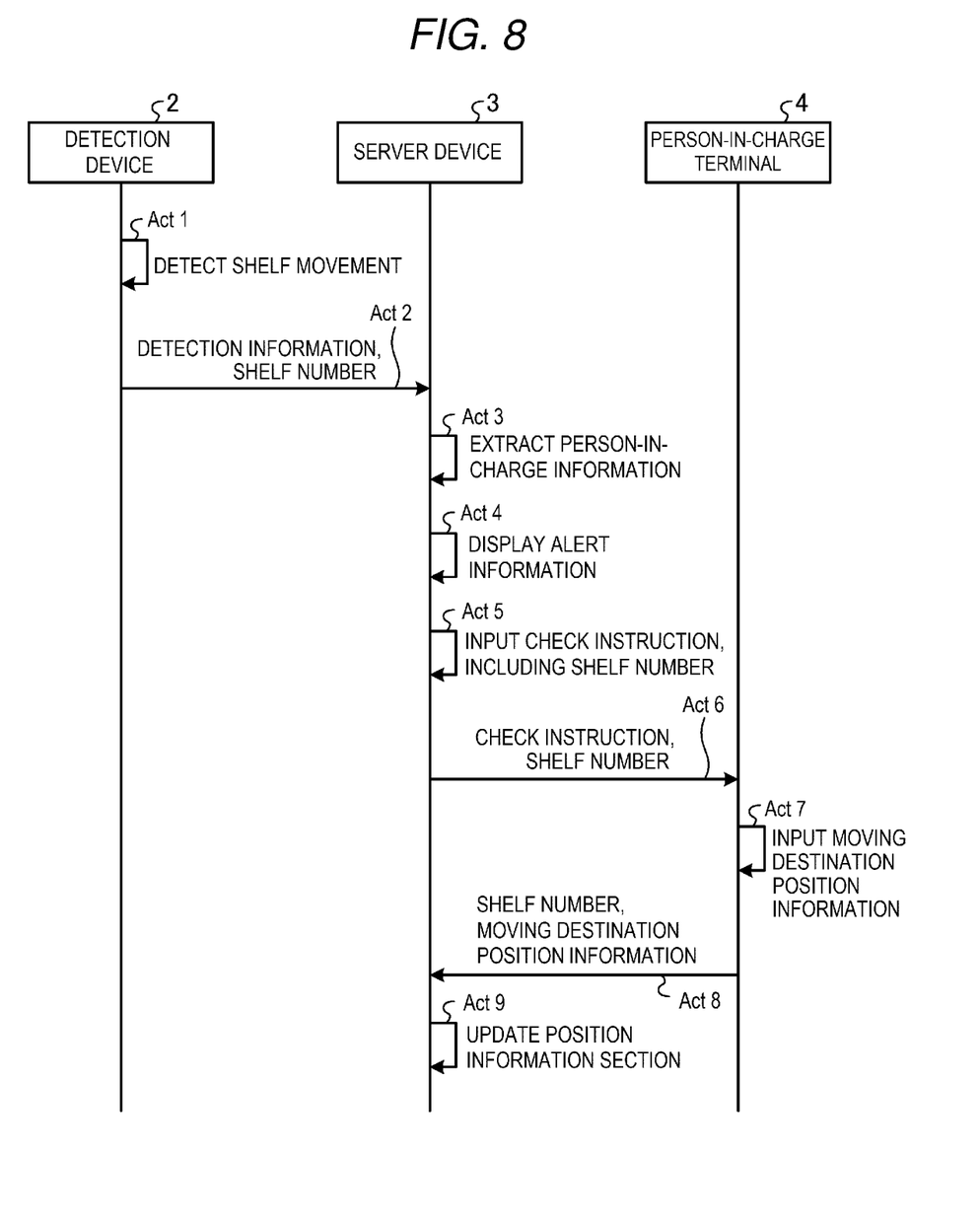
FIG. 8 is a sequence chart illustrating a flow of an operation of the position management system.

Subsequently, the operation of the position management system 1 having the configuration explained above is explained. FIG. 8 is a sequence chart illustrating a flow of the operation of the position management system 1. The sequence chart illustrates an operation in the case in which the detection device 2 detects that the commodity display shelf S is moved from a setting position.

If the commodity display shelf S is moved from the setting position in the selling floor, the detection device 2 detects the movement of the commodity display shelf S (Act 1). The detection device 2 transmits a shelf number and detection information of the moved commodity display shelf S to the server device 3 (Act 2).

The server device 3 extracts person-in-charge information corresponding to the received shelf number from the position information management table 312 (Act 3). The server device 3 displays, on the display unit 32, alert information including the extracted person-in-charge information (Act 4).

Figure 12:
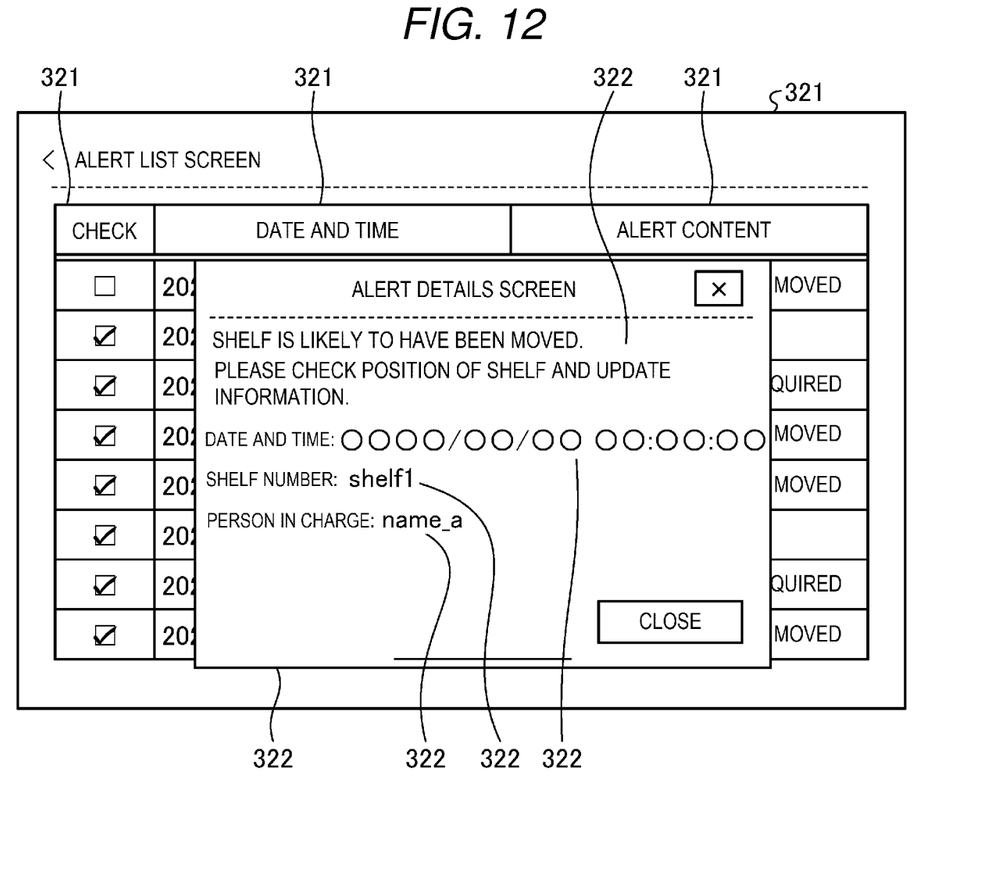
FIG. 12 is a diagram illustrating an alert display screen displayed on a display unit of the server device.

FIG. 12 is a diagram illustrating an alert display screen displayed on the display unit 32 in the processing in Act 4. An alert list screen notified by the position management system 1 and being checked by the administrator is displayed in a display region 321 of the display unit 32. A confirmation checkbox display section 3211, a date and time display section 3212, an alert content display section 3213, and the like are displayed on the alert list screen. As an alert to be notified, there is, for example, an alert indicating that the commodity display shelf S is moved and an alert indicating that a system error occurred.

If the administrator checks a confirmation checkbox of the alert list screen, an alert information display section 322 is popup-displayed. The alert information display section 322 displays alert information. The alert information display section 322 includes a message display section 3221, a date and time display section 3222, a shelf number display section 3223, and a person-in-charge display section 3224.

The message display section 3221 displays a message for urging the update of the position information management table 312. The date and time display section 3222 displays a date and time when the detection device 2 detected movement of the commodity display shelf S. The shelf number display section 3223 displays a shelf number of the commodity display shelf S, the movement of which is detected by the detection device 2. The person-in-charge display section 3224 displays a person-in-charge name of the commodity display shelf S, the movement of which is detected by the detection device 2.

The alert information displayed on the display unit 32 if the detection device 2 detects the movement of the commodity display shelf S includes not only the shelf number of the moved commodity display shelf S but also information concerning a person in charge extracted from the position information management table 312. Consequently, the administrator who browses the alert information can grasp the person in charge with whom the administrator should make contact in addition to the shelf number of the moved commodity display shelf S. Accordingly, it is possible to improve convenience of the administrator. A button for closing the alert information display section 322 is also displayed in the alert information display section 322.

Referring back to FIG. 8, the operation of the position management system 1 is explained. If the administrator confirms the person in charge with the alert information display section 322, the administrator inputs a check instruction to the server device 3 (Act 5). The server device 3 transmits the shelf number received from the detection device 2 and the check instruction to the person-in-charge terminal 4 of the person in charge included in the input check instruction (Act 6).

The person in charge faces the commodity display shelf S having the shelf number received by the person-in-charge terminal 4 carried by the person in charge and captures an image of the commodity display shelf S including a background image of the selling floor. Position information, that is, moving destination position information of the imaged commodity display shelf S is input to the person-in-charge terminal 4 by the application program installed in the person-in-charge terminal 4 (Act 7). The person-in-charge terminal 4 transmits the shelf number and the moving destination position information to the server device 3 (Act 8).

The server device 3 updates the position information management table 312 based on the received shelf number and the received moving destination position information (Act 9). More specifically, the server device 3 rewrites, in the position information management table 312, position information corresponding to the received shelf number to the moving destination position information.

According to the operation of the position management system 1, the administrator can grasp the movement of the commodity display shelf S and can update the position information management table 312 after causing the person in charge to check the commodity display shelf S.

Figure 9:
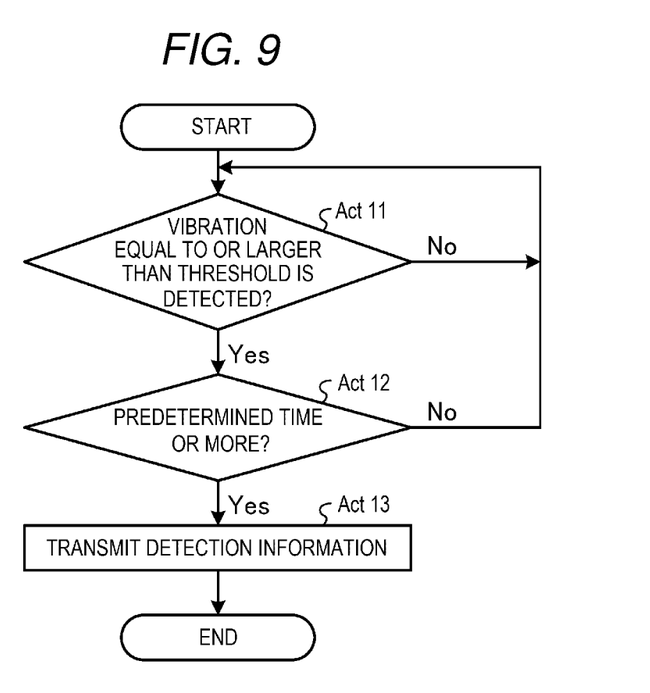
FIG. 9 is a flowchart illustrating a flow of detection processing by the control unit of the detection device.

Subsequently, detection processing executed by the detection device 2 is explained. FIG. 9 is a flowchart illustrating a flow of detection processing by the control unit 20 of the detection device 2.

The detecting unit 2002 determines whether an output value of the vibration sensor 22 input to the input unit 2001 is equal to or larger than the threshold A stored in the threshold information unit 212 (Act 11). If the output value of the vibration sensor 22 input to the input unit 2001 is not equal to or larger than the threshold A (N in Act 11), the control unit 20 returns to the processing in Act 11 and stays on standby.

If the output value of the vibration sensor 22 input to the input unit 2001 is equal to or larger than the threshold A (Y in Act 11), the detecting unit 2002 determines that vibration occurred and determines whether the vibration lasted for a predetermined time, that is, whether the vibration lasted for a time equal to or larger than the threshold B stored in the threshold information unit 212 (Act 12). If the vibration did not last for the predetermined time (N in Act 12), the control unit 20 returns to the processing in Act 11.

If the vibration detected by the detecting unit 2002 lasted for the predetermined time (Y in Act 12), the transmitting unit 2003 transmits a shelf number and detection information of the commodity display shelf S to the server device 3. The control unit 20 ends the detection processing.

According to the detection processing, the detection device 2 can detect the movement of the commodity display shelf S without using an expensive sensor for detecting the position information of the commodity display shelf S.

Figure 10:
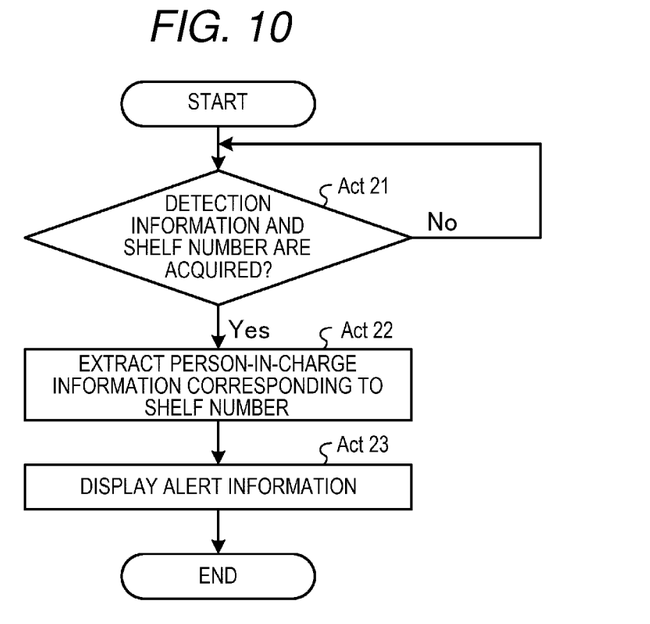
FIG. 10 is a flowchart illustrating a flow of alert display processing by the control unit of the server device.

Subsequently, alert display processing executed by the server device 3 is explained. FIG. 10 is a flowchart illustrating a flow of the alert display processing by the control unit 30 of the server device 3.

The control unit 30 determines whether the acquiring unit 3001 acquired detection information and a shelf number from any detection device 2 (Act 21) and, if the acquire unit 3001 did not acquire detection information and a shelf number (N in Act 21), returns to the processing in Act 21 and stays on standby.

If the acquiring unit 3001 acquires detection information and a shelf number (Y in Act 21), the extracting unit 3002 extracts, from the position information management table 312, person-in-charge information corresponding to the shelf number acquired by the acquiring unit 3001 (Act 22).

Subsequently, the output unit 3003 outputs, to the display unit 32, alert information including the shelf number acquired by the acquiring unit 3001, the person-in-charge information extracted by the extracting unit 3002, and a message for urging the update of the position information management table 312. The display unit 32 displays the alert information (Act 23). The control unit 30 ends the alert display processing.

According to the alert display processing, the server device 3 can inform the administrator that the commodity display shelf S is moved.

Figure 11:
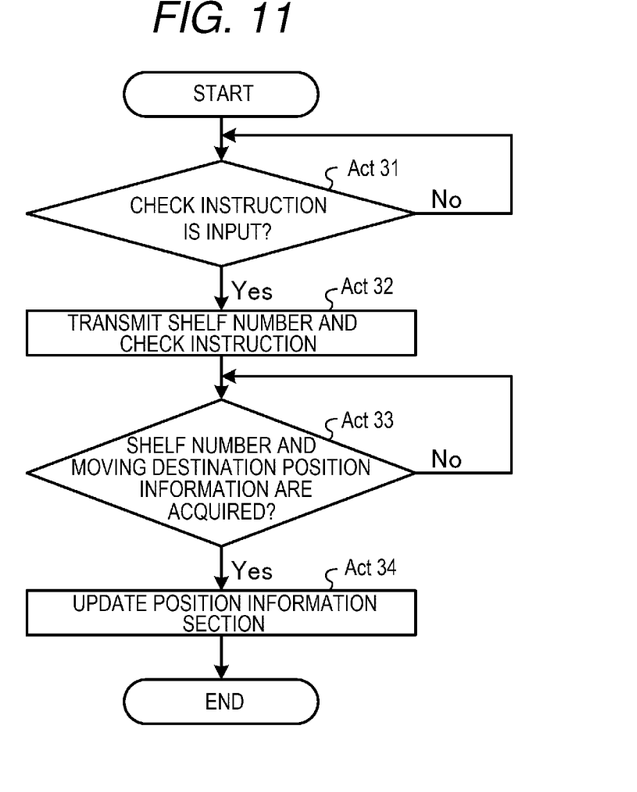
FIG. 11 is a flowchart illustrating a flow of update processing by the control unit of the server device.

Subsequently, update processing executed by the server device 3 is explained. FIG. 11 is a flowchart illustrating a flow of update processing by the control unit 30 of the server device 3. The update processing is executed following the alert display processing.

The control unit 30 determines whether a check instruction is input from the operation unit 33 together with a shelf number (Act 31) and, if the check instruction is not input (N in Act 31), the control unit 30 returns to the processing in Act 31 and stays on standby. The check instruction is an instruction for the administrator to instruct the person in charge to check the position of the commodity display shelf S.

If the check instruction is input from the operation unit 33 (Y in Act 31), the output unit 3003 transmits the shelf number and the check instruction to the person-in-charge terminal 4 (Act 32). Specifically, if the check instruction is input to the operation unit 33 in a state in which the alert information display section 322 illustrated in FIG. 12 is displayed, the output unit 3003 reads out alert information displayed on the display unit 32 from the RAM 303 storing the alert information. The output unit 3003 refers to a person-in-charge-information storing unit (not illustrated) storing a person in charge and a notification destination (for example, an IP address of the person-in-charge terminal 4) of the person in charge in association with each other and specifies a notification destination of the person in charge included in the read-out alert information. The output unit 3003 transmits the check instruction and the shelf number included in the alert information to the specified notification destination, that is, the person-in-charge terminal 4 of the person in charge included in the alert information.

Subsequently, the control unit 30 determines whether the moving-destination-position-information acquiring unit 3004 acquired, from the person-in-charge terminal 4, the shelf number transmitted in Act 32 and moving destination position information and, if moving-destination-position-information acquiring unit 3004 did not acquire the shelf number and the moving destination position information (N in Act 33), returns to the processing in Act 33 and stays on standby.

If the moving-destination-position-information acquiring unit 3004 acquires the shelf number and the moving destination position information from the person-in-charge terminal 4 (Y in Act 33), the updating unit 3005 accesses the memory unit 31 and updates the position information management table 312 (Act 34). The control unit 30 ends the update processing.

Second Embodiment

Subsequently, a second embodiment is explained. The second embodiment is different from the first embodiment in that the detection device 2 can detect position information of the commodity display shelf S and in that the server device 3 acquires moving destination position information from the detection device 2 and automatically updates the position information management table 312. In the following explanation, explanation is sometimes omitted about the same components and the same functions as the components and the functions in the first embodiment. This is to avoid the following explanation becoming unnecessarily redundant and facilitate understanding of those skilled in the art.

The detection device 2 includes a not-illustrated positioning unit. The positioning unit is a unit for specifying the position of the commodity display shelf S, in other words, an own position of the detection device 2 attached to the commodity display shelf S in the selling floor. The positioning unit is configured by, for example, a GPS (Global Positioning System) receiver. A method of specifying the position of the commodity display shelf S is not limited to the GPS positioning. For example, the positioning unit may receive reference signals transmitted from a plurality of beacon transmitters set in the selling floor to thereby specify the position of the commodity display shelf S.

The detection device 2 transmits position information indicating the position of the commodity display shelf S positioned by the positioning unit and a shelf number of the commodity display shelf S to the server device 3. If the detecting unit 2002 determines that the commodity display shelf S is moved and located at a moving destination, the detection device 2 transmits the position information to the server device 3. The position information indicates the position of the moving destination of the commodity display shelf S and is moving destination position information. The detection device 2 may periodically output position information positioned by the positioning unit to the server device 3. In this case, the server device 3 specifies the moving destination of the commodity display shelf S based on the periodically acquired position information.

The server device 3 updates the position information management table 312 based on the shelf number and the moving destination position information received from the detection device 2. More specifically, the server device 3 rewrites, in the position information management table 312, position information corresponding to the received shelf number to the moving destination position information.

Figure 13:
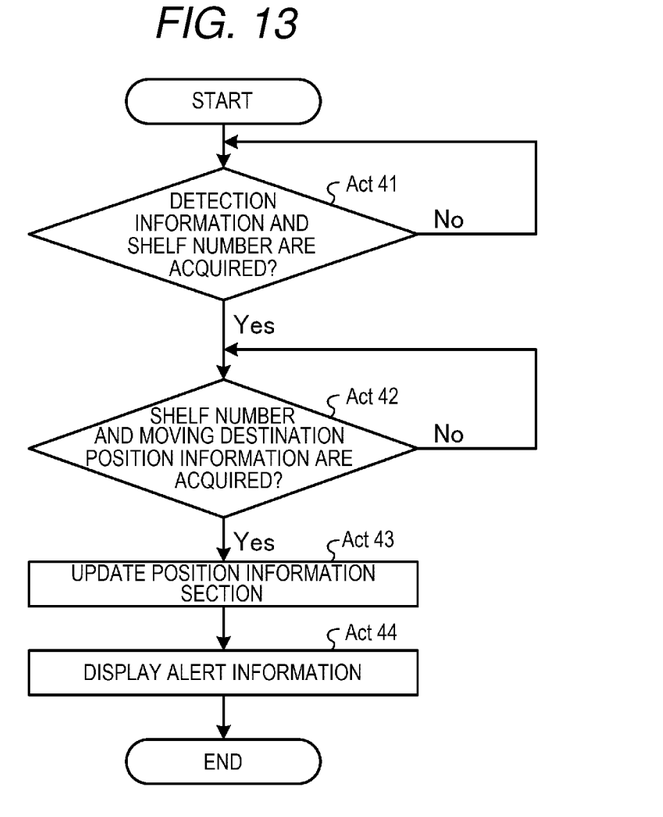
FIG. 13 is a flowchart illustrating a flow of display and update processing by a control unit of a server device in a second embodiment.

Display and update processing executed by the server device 3 in this embodiment is explained. FIG. 13 is a flowchart illustrating a flow of the display and update processing by the control unit 30 of the server device 3.

The control unit 30 determines whether the acquiring unit 3001 acquired detection information and a shelf number from any detection device 2 (Act 41) and, if the acquiring unit 3001 did not acquire detection information and a shelf number (N in Act 41), returns to the processing in Act 41 and stays on standby.

If the acquiring unit 3001 acquires detection information and a shelf number (Y in Act 41), the control unit 30 determines whether the moving-destination-position-information acquiring unit 3004 acquired the shelf number and the moving destination position information acquired in Act 41 (Act 42).

If the moving-destination-position-information acquiring unit 3004 did not acquire the shelf number and the moving destination position information (N in Act 42), the control unit 30 returns to the processing in Act 42 and stays on standby. If the moving-destination-position-information acquiring unit 3004 acquires the shelf number and the moving destination position information (Y in Act 42), the updating unit 3005 accesses the memory unit 31 and updates the position information management table 312 (Act 43).

Subsequently, the output unit 3003 outputs alert information to the display unit 32. The display unit 32 displays the alert information (Act 44). The control unit 30 ends the display and update processing.

The alert information in this embodiment includes the shelf number and a message indicating that the position information management table 312 is updated. The shelf number and the message indicating that the position information management table 312 is updated are examples of alert information concerning the update of the position-information storing section. In the first embodiment, the person-in-charge information is displayed on the display unit 32 as a part of the alert information in order to make it easy to acquire the moving destination position information from the person-in-charge terminal 4. However, in this embodiment, it is unnecessary to display the person-in-charge information. This is because the server device 3 already acquired the moving destination position information from the detection device 2 and may not output a check instruction to the person-in-charge terminal 4.

According to the display and update processing, if the commodity display shelf S is moved from a setting position indicated by the position information stored in the position information management table 312 to another setting position, the server device 3 can automatically update the position information management table 312. Consequently, it is possible to easily manage the position of the commodity display shelf S.

As explained above, the information processing device (the server device 3) in the first embodiment and the second embodiment includes the acquiring unit 3001 that acquires identification information (a shelf number) for identifying the commodity placing table (the commodity display shelf S) moved from a setting position, the updating unit 3005 that updates the position-information storing section (the position information management table 312) that stores the identification information and position information indicating the setting position of the commodity placing table in association with each other, and the output unit 3003 that, if the acquiring unit 3001 acquires the identification information, outputs alert information concerning the update of the position-information storing section.

Consequently, if the commodity display shelf S is moved, the administrator can easily recognize that the moved commodity display shelf S is present. As a result, the administrator can easily update the position information management table 312.

The output unit 3003 of the server device 3 in the first embodiment outputs alert information including a shelf number of the commodity display shelf S moved from the setting position and a message for urging the update of the position information management table 312.

Consequently, it is possible to prevent the administrator from forgetting to update the position information management table 312. Accordingly, if the commodity display shelf S is moved, it is possible to surely update the position information management table 312 for managing the position of the commodity display shelf S.

The server device 3 in the first embodiment and the second embodiment further includes the moving-destination-position-information acquiring unit 3004 that acquires moving destination position information indicating a position to where the commodity display shelf S is moved. The updating unit 3005 updates the position information management table 312 based on the moving destination position information acquired by the moving-destination-position-information acquiring unit 3004.

Consequently, the administrator can easily perform a data input for updating the position information management table 312.

In the embodiments, the control programs executed by the detection device 2, the server device 3, and the person-in-charge terminal 4 may be provided by being recorded in a computer-readable recording medium such as a CD-ROM. The control programs executed by the devices may be stored on a computer connected to a network such as the Internet and may be provided by being downloaded through the network. Further, the control programs may be provided through a network such as the Internet.

While the embodiments of the present disclosure are explained above, the embodiments are presented as examples and are not intended to limit the scope of the invention. The embodiments can be implemented in other various forms. Various omissions, substitutions, and changes can be made without departing from the gist of the invention. The embodiments and the modifications thereof are included in the scope and the gist of the invention and included in the inventions described in the claims and the scope of equivalents of the inventions.

What is claimed is:

1. An information processing device, comprising:
    an acquiring component configured to acquire identification information for identifying a commodity placing table moved from a setting position;
    an updating component configured to update a position-information storing section that stores the identification information and position information indicating the setting position of the commodity placing table in association with each other; and
    an output component configured to, if the acquiring component acquires the identification information, output alert information concerning an update of the position-information storing section.

2. The information processing device according to claim 1, wherein the output component outputs alert information including the identification information of the commodity placing table moved from the setting position and a message for urging the update of the position-information storing section.

3. The information processing device according to claim 1, further comprising a moving-destination-position-information acquiring component configured to acquire moving destination position information indicating a position to where the commodity placing table is moved, wherein
    the updating component updates the position-information storing section based on the moving destination position information acquired by the moving-destination-position-information acquiring component.

4. The information processing device according to claim 1, wherein the position information comprises at least one of three-dimensional data and two-dimensional data.

5. The information processing device according to claim 1, wherein if an output value from a sensor is equal to or larger than a first threshold stored in a threshold information component and lasts for a time equal to or larger than a second threshold stored in the threshold information component, a determination that the commodity placing table is moved from the setting position is made.

6. The information processing device according to claim 1, wherein the acquiring component, the updating component, and the output component are connected to each other wirelessly.

7. A position management system, comprising:
    a detection device configured to detect movement of a commodity placing table; and
    an information processing device communicably connected to the detection device, wherein
    the detection device includes:
        a detector configured to detect that the commodity placing table is moved from a setting position; and
        a transmitting component configured to transmit, to the information processing device, identification information for identifying the commodity placing table, the movement of which is detected by the detector, and
    the information processing device includes:
        an acquiring component configured to acquire the identification information transmitted by the transmitting component;

an updating component configured to update a position-information storing section that stores the identification information and position information indicating the setting position of the commodity placing table in association with each other; and an output component configured to, if the acquiring component acquires the identification information, output alert information concerning an update of the position-information storing section.

8. The position management system according to claim 7, further comprising a terminal device configured to acquire the alert information output by the output component.

9. The position management system according to claim 7, wherein the detection device includes a vibration sensor, and the detector detects the movement of the commodity placing table based on magnitude and a time of vibration detected by the vibration sensor.

10. The position management system according to claim 9, wherein if an output value from the vibration sensor is equal to or larger than a first threshold stored in a threshold information component and lasts for a time equal to or larger than a second threshold stored in the threshold information component, the detecting device determines that the commodity placing table is moved from the setting position.

11. The position management system according to claim 7, wherein the position information comprises at least one of three-dimensional data and two-dimensional data.

12. The position management system according to claim 7, wherein the detection device, information processing device, the acquiring component, the updating component, and the output component are connected to each other wirelessly.

13. The position management system according to claim 7 comprising a plurality of detection devices.

14. A method for information processing, comprising:

acquiring identification information for identifying a commodity placing table moved from a setting position;

updating a position-information storing section that stores the identification information and position information indicating the setting position of the commodity placing table in association with each other; and if the identification information is acquired, outputting alert information concerning an update of the position-information storing section.

15. The method according to claim 14, further comprising:

detecting movement of the commodity placing table.

16. The method according to claim 15, further comprising:

detecting that the commodity placing table is moved from a setting position; and transmitting, to an information processing device, identification information for identifying the commodity placing table, the movement of which is detected.

17. The method according to claim 14, further comprising:

outputting alert information including the identification information of the commodity placing table moved from the setting position and a message for urging the update of the position-information storing section.

18. The method according to claim 14, further comprising:

acquiring moving destination position information indicating a position to where the commodity placing table is moved; and updating a position-information storing section based on the moving destination position information acquired.

19. The method according to claim 14, wherein the position information comprises at least one of three-dimensional data and two-dimensional data.

20. The method according to claim 14, further comprising:

if an output value from a sensor is equal to or larger than a first threshold stored and lasts for a time equal to or larger than a second threshold stored, determining that the commodity placing table is moved from the setting position.

* * * * *